(12) United States Patent
Yumita et al.

(10) Patent No.: US 6,980,072 B2
(45) Date of Patent: Dec. 27, 2005

(54) LINEAR ACTUATOR, AND PUMP AND COMPRESSOR DEVICES USING THE ACTUATOR

(75) Inventors: Yukinobu Yumita, Nagano (JP); Shohzoh Tanaka, Nara (JP); Kazuhiko Ueda, Nara (JP)

(73) Assignees: Nidec Sankyo Corporation, Nagano (JP); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/515,893

(22) PCT Filed: Jun. 17, 2003

(86) PCT No.: PCT/JP03/07694

§ 371 (c)(1),
(2), (4) Date: Nov. 23, 2004

(87) PCT Pub. No.: WO03/107515

PCT Pub. Date: Dec. 24, 2003

(65) Prior Publication Data

US 2005/0206486 A1    Sep. 22, 2005

(30) Foreign Application Priority Data

Jun. 18, 2002  (JP) ............................. 2002-176703

(51) Int. Cl.⁷ ............................................. H01F 7/00
(52) U.S. Cl. ...................... 335/229; 335/261; 335/279; 335/281; 310/12; 310/15; 417/410.1; 417/417
(58) Field of Search ................................ 335/229–234, 335/255, 261, 270, 279, 281; 310/12–15; 417/410.1, 415–417

(56) References Cited

U.S. PATENT DOCUMENTS

| | | | |
|---|---|---|---|
| 6,077,054 A | * | 6/2000 | Lee et al. ................... 417/417 |
| 6,365,993 B1 | | 4/2002 | Calhoon et al. |
| 2003/0017064 A1 | * | 1/2003 | Kawahar et al. ............ 417/417 |
| 2003/0091449 A1 | * | 5/2003 | Song et al. ................. 417/417 |

FOREIGN PATENT DOCUMENTS

| | | |
|---|---|---|
| JP | 06-91727 | 11/1994 |
| JP | 2000-209833 | 7/2000 |
| JP | 2002-034225 | 1/2002 |

* cited by examiner

*Primary Examiner*—Ramon M. Barrera
(74) *Attorney, Agent, or Firm*—Flynn, Thiel, Boutell & Tanis, P.C.

(57) ABSTRACT

A linear actuator has inner yokes, outer yokes forming gaps between themselves and the inner yokes, and a movable body provided with planar magnets in the gaps. Eight pieces each of the inner yokes and the outer yokes are arranged at equal angular intervals in a circumferential direction with planar faces of each of the inner yokes and the of the outer yokes being opposed to each other. The movable body has magnet retaining portions having a substantially triangular shape and placed between adjacent inner yokes and between adjacent outer yokes. A linear actuator having high magnetism usability can be structured using magnetic parts suitable for mass production.

13 Claims, 7 Drawing Sheets

LINEAR ACTUATOR, AND PUMP AND COMPRESSOR DEVICES USING THE ACTUATOR

TECHNICAL FIELD

The present invention relates to a linear actuator, and to a pump device and a compressor device in which this linear actuator is used. More specifically, the present invention relates to a linear actuator with a structure wherein inner yokes and outer yokes are disposed in the circumferential direction.

BACKGROUND ART

Generally, a motor that outputs rotational movement is used as an actuator for a pump device or compressor device in which a piston moves rectilinearly within a cylinder. Therefore, problems are encountered in that power is not transmitted efficiently because the rotational movement must be converted to rectilinear movement by a crankshaft or the like between an output shaft of the motor and the piston.

Figure 7:
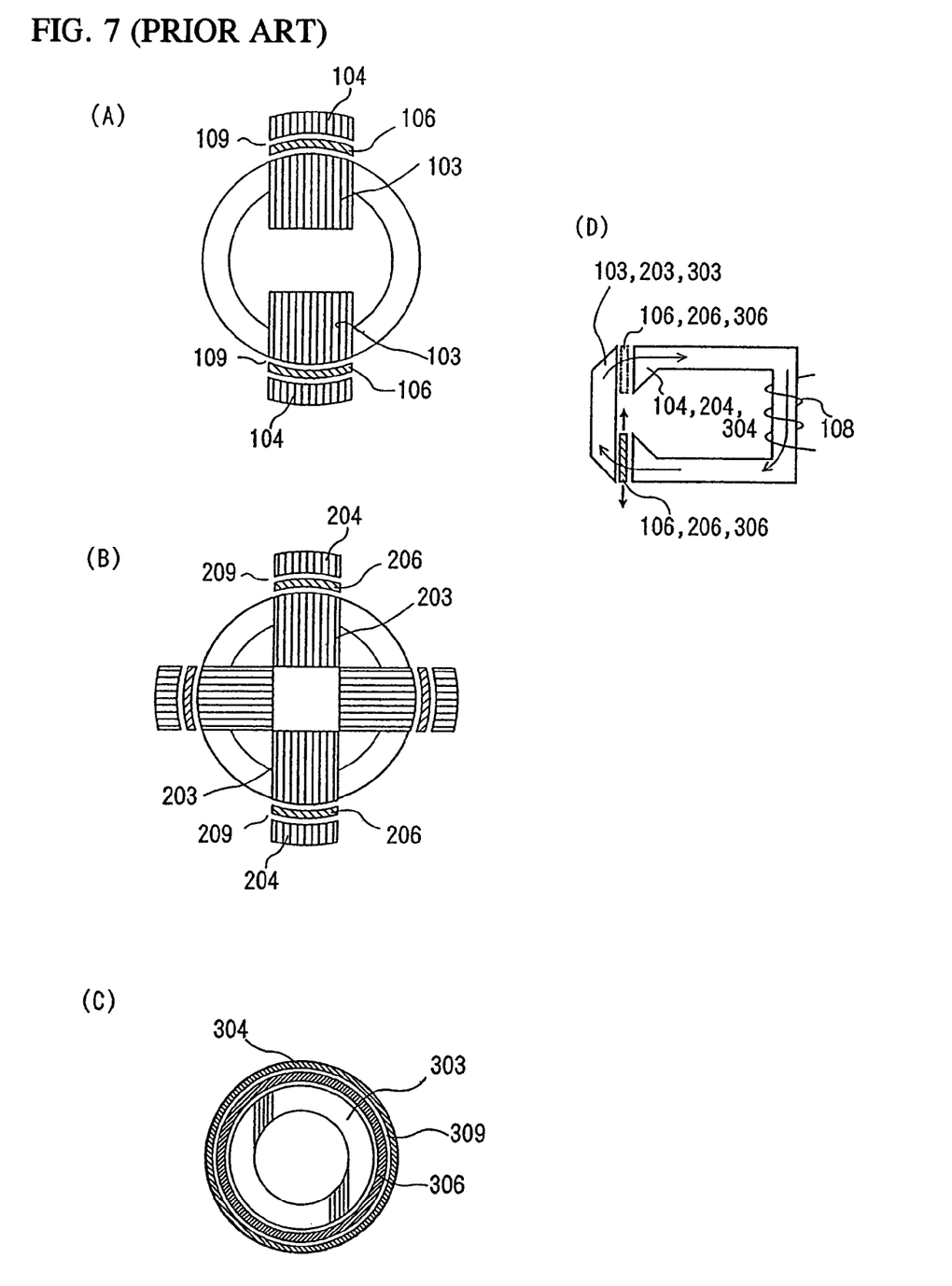

In view of this, the configuration described in connection with the electromechanical converter disclosed in JP-B 6-91727 has been considered for use as a linear actuator. As shown in FIGS. 7(A) and (B), the linear actuator disclosed herein includes two or four inner yokes 103, 203, two or four outer yokes 104, 204 disposed so as to form gaps 109, 209 with outer surfaces of the inner yokes 103, 203, coils (not shown) wound around the outer yokes 104, 204, and magnets 106, 206 disposed in the gaps 109, 209. A layered structure is used for the inner yokes 103, 203 and the outer yokes 104, 204 so that multiple magnetic thin plates are layered on opposite sides so as to describe an arc, and arcuate components are used as magnets 106, 206 to match the shape thereof.

Another possibility is shown in FIG. 7(C), wherein a cylindrical inner yoke 303 and a cylindrical outer yoke 304 face each other via a prescribed gap 309, and a cylindrical magnet 306 is disposed in the gap 309.

All these structures appear as shown in FIG. 7(D) when cut in an axial direction. When an alternating current flows through a coil 108, the orientation alternates between a magnetic field created between the inner yokes 103, 203, 303, the outer yokes 104, 204, 304, and one of the leg portions, and a magnetic field created between the inner yokes 103, 203, 303, the outer yokes 104, 204, 304, and the other leg portion. Therefore, the magnets 106, 206, 306 oscillate in the axial direction, so a movable member (not shown) formed integrally with the magnets also oscillates in the axial direction, and reciprocating rectilinear movement can be outputted from the movable member.

However, with the configuration shown in FIGS. 7(A) and (B), in order for the gaps 109, 209 to have an arcuate shape, the magnetic thin plates must be layered while being shifted in small increments by using a special layered structure when manufacturing the inner yokes 103, 203 and the outer yokes 104, 204, which makes mass production difficult. Also, precise polishing is necessary when manufacturing curved magnets 106, 206, which also makes mass production difficult. Similarly, it has been difficult to manufacture the ring-shaped inner yoke 303, outer yoke 304, and magnet 306 shown in FIG. 7(C). Furthermore, problems have been encountered when disposing a plurality of magnets in relation to a movable member in that assembly operations require much labor because the magnets attract or repel each other.

DISCLOSURE OF THE INVENTION

An object of the present invention is to provide a linear actuator that uses magnetic components with a structure suitable for mass production and that efficiently utilizes magnetism, and a pump device and compressor device in which this linear actuator is used.

According to the present invention, there is provided a linear actuator which includes inner yokes, outer yokes whereby gaps perpendicular to an axial direction are formed with the inner yokes, a coil wound on the outer yokes, and a movable member having magnets in the gap and capable of moving in the axial direction, wherein the linear actuator is characterized in that pluralities of the outer yokes and inner yokes have planar opposing surfaces and are disposed at regular angular intervals in a circumferential direction, and the movable member comprises the magnet in each gap formed by the outer yokes and inner yokes, and also comprises magnet holders which are disposed between adjacent magnets and which hold both sides of the magnets in a state in which at least part thereof extends between adjacent inner yokes and between adjacent outer yokes.

In the linear actuator of the present invention, magnetic fields generated in the gaps adjacent in the axial direction between the outer yokes and inner yokes alternate with each other when an alternating current is passed through the coil. Therefore, an axial orientation of a force applied to the magnets alternates, so the movable member formed integrally therewith oscillates in the axial direction. For this reason, reciprocating rectilinear movement can be outputted from the movable member.

In this arrangement, the outer yokes and inner yokes have planar opposing surfaces and face each other via gaps perpendicular to the axial direction, and a plurality of such yokes are disposed at regular angular intervals in the circumferential direction. Therefore, in practice, a drive force can be generated with substantially the same magnetic efficiency as when the opposing surfaces of the outer yokes and inner yokes are formed into arcs. Also, since the movable member includes the magnet holders for holding both sides of the magnets in a state in which at least part thereof extends between adjacent inner yokes and between adjacent outer yokes, the orientation or location of the magnets is accurately set by the magnet holders even if the magnets attract or repel each other. For this reason, assembly is easier to accomplish. Therefore, according to the present invention, it is possible to provide an inexpensive mass-produced linear actuator.

In the present invention, the magnets of the movable member are preferably flat plate magnets. With this configuration, the opposing surfaces of the outer yokes and inner yokes are flat, allowing flat plate magnets to be used and mass production to be facilitated.

In the present invention, the magnet holders preferably have a substantially triangular shape as seen from the axial direction, and are configured so that at least part thereof extends between adjacent inner yokes and between adjacent outer yokes. With this configuration, it is possible to prevent the orientation, shape, or other attributes of the magnets from being altered by the magnetic force of adjacent magnets, even if strong flat plate magnets are used.

In the present invention, the inner yokes and outer yokes may form the gaps at two locations separated in the axial direction, for example. In this case, the magnets are disposed extending across two gaps separated in the axial direction.

In the present invention, six or more outer yokes and inner yokes are preferably disposed at regular angular intervals in the circumferential direction. With less than six outer yokes and inner yokes, a portion of the outer yokes disposed radially outside of the coil increases in size in the circumferential direction, so if the coil is to be accommodated in a prescribed frame, an inside diameter of the coil cannot decrease because of components that must fit inside the coil, which makes it difficult to secure the winding space for the coil. However, the present invention makes it possible to avoid such problems.

In the present invention, the coil is configured as a common coil wound so as to encircle all six or more of the outer yokes disposed in the circumferential direction, for example. Also, each outer yoke has a first outer yoke portion extending rectilinearly in the circumferential direction on the inner circumferential side of the coil, and a second outer yoke portion extending rectilinearly in the circumferential direction on the outer circumferential side of the coil, wherein the coil is preferably wound rectilinearly between the first outer yoke portion and the second outer yoke portion. With this configuration, no gaps are formed between the coil and the first outer yoke portion, unlike when the coil is wound in a circular pattern, so the number of turns of the coil can be proportionally increased within a smaller space, and the actuator performance can be improved. In other words, if the number of turns of the coil is the same, the width of the outer yoke in the radial direction can be reduced, and small size can be ensured.

In this case, it is preferred that six through eight of the outer yokes be disposed at regular angular intervals. If there are six through eight outer yokes, there are also six through eight magnet holders. As a result of the increase in the number of magnets accompanying the increase in the number of outer yokes or inner yokes, the number of magnet holders also increases and the space occupied by the magnet holders increases as well. However, reducing the magnet holders makes them incapable of withstanding the magnetic force exerted by adjacent magnets on each other because of the use of strong magnets, so in this respect the number of outer yokes or inner yokes should be small. At the same time, dimensions of the outer yokes in the circumferential direction are determined by the number of outer yokes provided, so the circumferential dimensions of the outer yokes are also determined by the number of outer yokes. Furthermore, the number of outer yokes should be the maximum possible in relation to the space in which the coil is accommodated. Given this plurality of elements, using six through eight outer yokes is preferred for establishing balance among the elements.

In the present invention, it is preferred that the outer yokes be configured as a plurality of dividable yoke pieces, and the outer yokes have a structure wherein a separately wound coil is held on either side by the plurality of yoke pieces.

In the present invention, at least one of the outer yoke and inner yoke has a layered structure composed of a plurality of magnetic thin plates, for example. With this configuration, it is possible to improve high-frequency characteristics because eddy-current loss can be suppressed.

In the present invention, at least one of outer yoke and inner yoke is preferably configured from sintered soft magnetic components. If sintered powder coated with a resin is used for such sintered soft magnetic components, high-frequency characteristics can be improved because eddy-current loss can be reduced.

The linear actuator according to the present invention can be utilized as a compressor device or a pump device for supplying fluids.

BRIEF DESCRIPTION OF THE DRAWINGS

FIGS. 1(A) and (B) are an explanatory diagram depicting the linear actuator according to the present invention, and an explanatory diagram depicting a cutaway view thereof, respectively;

FIGS. 2(A), (B), (C), and (D) are a cross-sectional view along the line A–A' of the stator of the linear actuator shown in FIG. 1, an explanatory diagram depicting a cutaway view thereof, a plan view of an inner yoke holding member for holding the inner yoke, and an explanatory diagram depicting a structural example of the inner yoke, respectively;

FIGS. 3(A), (B), (C), (D), and (E) are a plan view, longitudinal sectional view, and bottom view of the movable member side of the linear actuator, as well as an explanatory diagram of poles formed by magnetization on the magnet and an enlarged plan view of the magnet holders, respectively;

FIGS. 4(A) and (B) are an explanatory diagram of the coil wound in a circular fashion when there are six outer yokes in the linear actuator according to the present invention, and an explanatory diagram of the coil wound in a substantially polygonal fashion, respectively;

FIGS. 5(A) and (B) are an explanatory diagram of the coil wound in a circular fashion when there are eight outer yokes in the linear actuator according to the present invention, and an explanatory diagram of the coil wound in a substantially polygonal fashion, respectively;

FIGS. 6(A) and (B) are an explanatory diagram of the coil wound in a circular fashion when there are twelve outer yokes in the linear actuator according to the present invention, and an explanatory diagram of the coil wound in a substantially polygonal fashion, respectively; and FIGS. 7(A), (B), (C), and (D) are explanatory diagrams of a conventional linear actuator.

SYMBOLS 1 linear actuator
2 cylinder body
3 inner yoke
4 outer yoke
5 movable member
6 magnet
8 coil
9A, 9B gap
11 frame
22 cylindrical section
23 inner yoke holding member
41, 42 yoke piece
43, 44 magnetic pole
50 piston
52 magnet holder
401 first outer yoke portion
402 second outer yoke portion

BEST MODE FOR CARRYING OUT THE INVENTION

A linear actuator to which the present invention is applied will now be described with reference to the diagrams.

Figure 1:
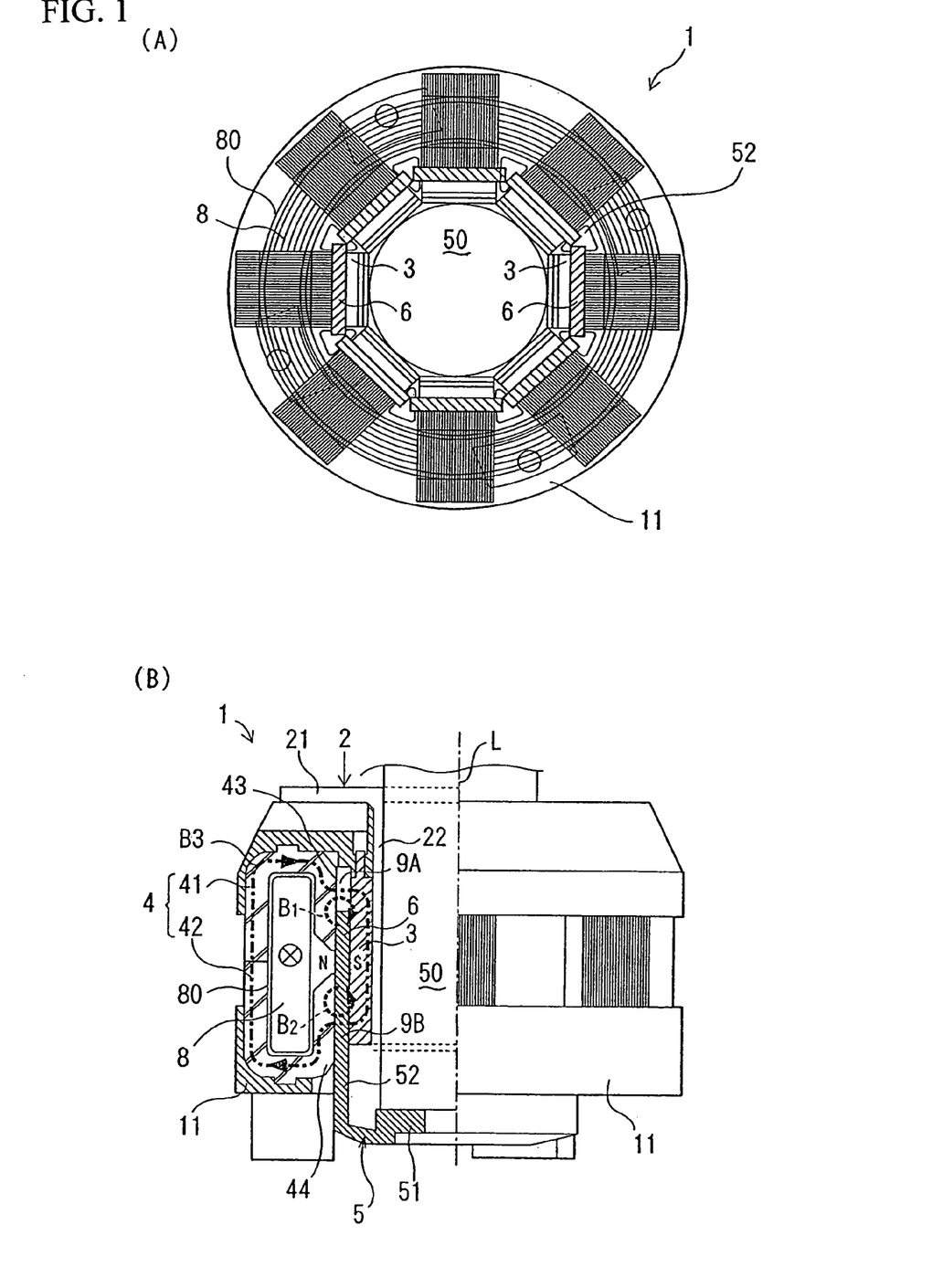
Figure 2:
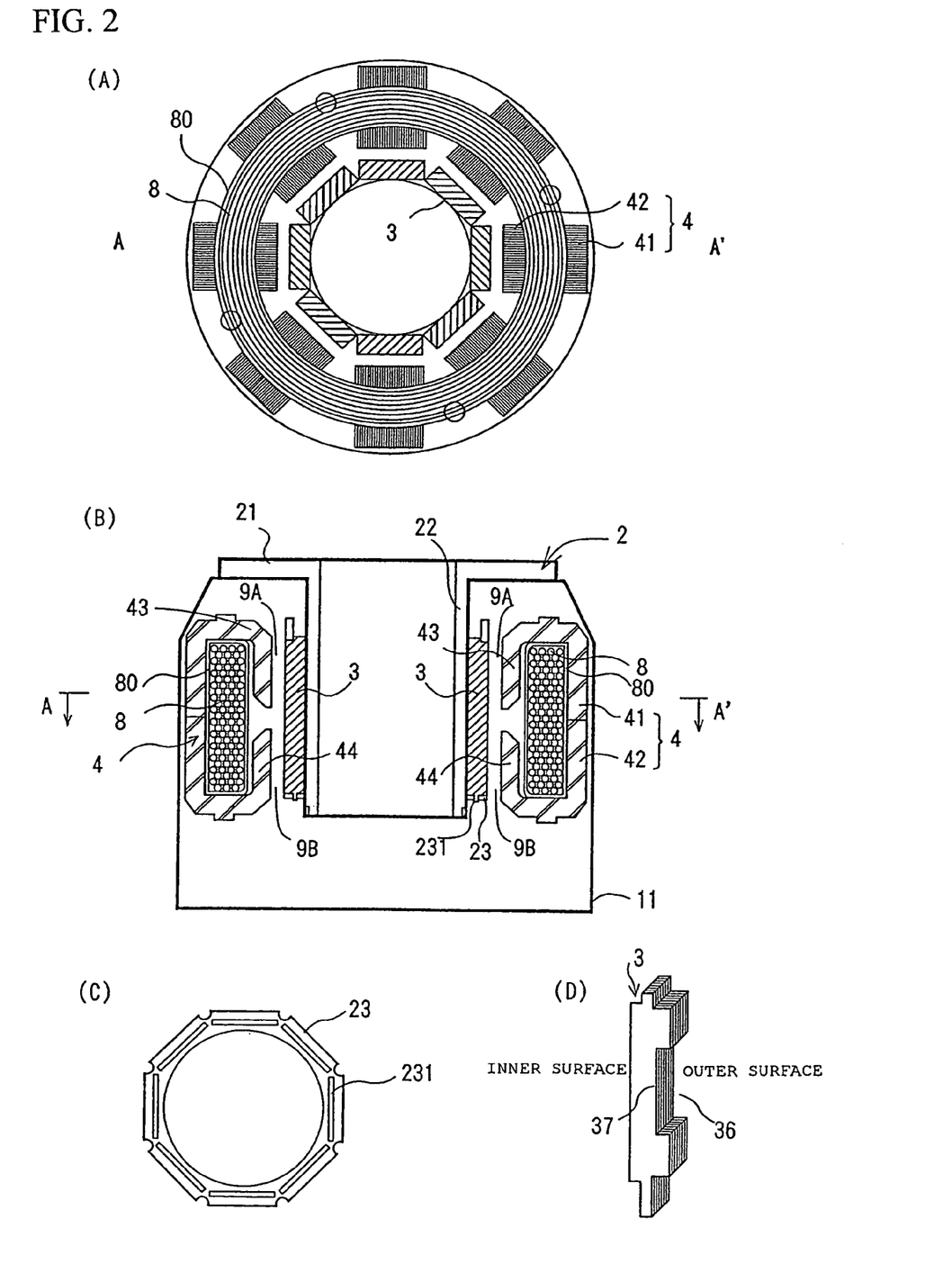
Figure 3:
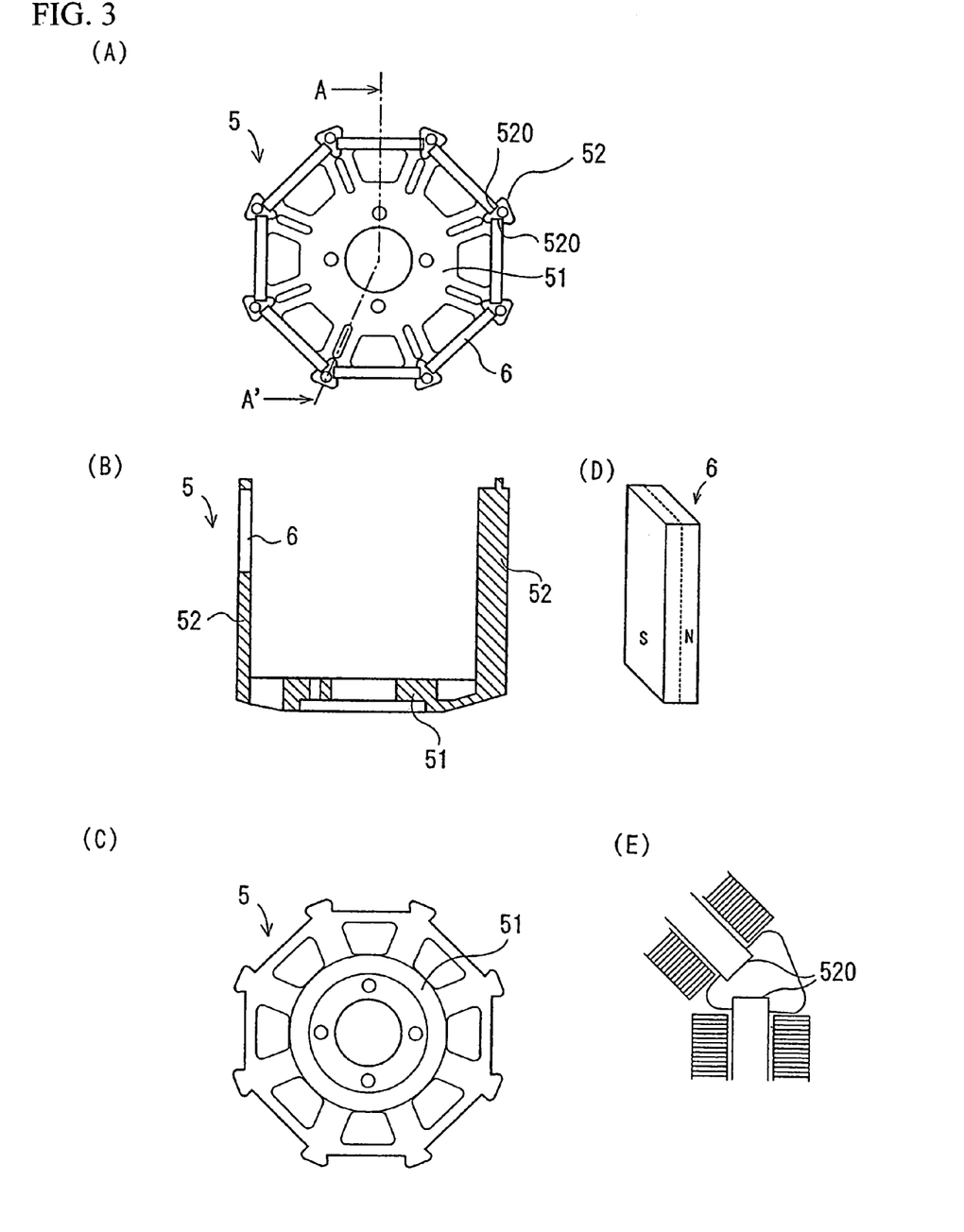

FIGS. 1(A) and (B) are a partial plan view of a linear actuator according to the present invention, and an explanatory diagram depicting a cutaway view thereof, respectively. FIGS. 2(A), (B), (C), and (D) are a cross-sectional view along the line A–A' of a stator of this linear actuator, an explanatory diagram depicting a cutaway view thereof, a plan view of an inner yoke holding member for holding an inner yoke, and an explanatory diagram depicting a structural example of the inner yoke, respectively. FIGS. 3(A), (B), (C), (D), and (E) are a plan view, longitudinal sectional view, and bottom view of the movable member side of the linear actuator, as well as an explanatory diagram of poles formed by magnetization on a magnet and an enlarged plan view of the magnet holders, respectively.

In FIGS. 1(A) and (B), the linear actuator 1 of the present embodiment is used in a compressor device or a pump device for supplying fluids, and the actuator has a frame 11 for holding a stator side, and a movable member 5 capable of rectilinear movement along an axis line L in relation to the frame 11. The frame 11 is mounted on a pump case or other device, for example.

A cylinder body 2 with a flange part 21 is held in the frame 11 on the stator side, as shown in FIGS. 2(A) and (B). A circular plate-shaped inner yoke holding member 23 shown in FIG. 2(C) is mounted on an outer peripheral surface of a cylindrical section 22 of the cylinder body 2.

The inner yoke holding member 23 has eight rectilinearly extending slits 231 formed at regular angular intervals in a circumferential direction, and inner yokes 3 composed of magnetic plates are fixed in place in the inner yoke holding member 23 at positions corresponding to the slits 231. Therefore, eight inner yokes 3 are disposed at regular angular intervals in the circumferential direction.

The inner yokes 3 are shaped as flat plates, and both opposing surfaces (outer surfaces) facing outer yokes 4 described herein below and back surfaces (inner surfaces) are flat surfaces. As used herein, the term "flat opposing surfaces" refers to a configuration in which the entire outer surfaces of the inner yokes 3 lie in the same plane, or a configuration in which concavities 36 are formed in the outer surfaces of the inner yokes 3, and bottom surfaces of these concavities 36 are made flat as opposing surfaces 37 facing the outer yokes 4 for the purpose of improving magnetic characteristics, as shown in FIG. 2(D).

Eight outer yokes 4 are mounted at regular angular intervals in the circumferential direction on the frame 11 in a block structure in which two gaps 9A and 9B are formed at positions separated from the opposing surfaces of the inner yokes 3 in the axial direction. In the present embodiment, the surfaces of the outer yokes 4 that face the inner yokes 3 are made flat.

The outer yokes 4 are configured from two vertically aligned yoke pieces 41 and 42 with U-shaped longitudinal sections, and portions of the yoke pieces 41 and 42 that curve inside in the axial direction are formed into magnetic poles 43 and 44 that face the inner yokes 3 via the gaps. The two yoke pieces 41 and 42 both have a block structure wherein a plurality of magnetic thin plates with end faces directed towards the inner yokes 3 are layered in an out-of-plane direction. The advantage of this arrangement is that eddy-current loss in the outer yokes 4 is relatively small.

In the outer yokes 4, a coil 8 wound around a bobbin 80 with a flat ring shape is disposed in spaces formed between the two yoke pieces 41 and 42. The coil 8 is a common coil wound so as to entirely encircle the eight outer yokes 4. The outer yokes 4 comprise first outer yoke portions 401 extending rectilinearly in the circumferential direction around the inside of the coil 8, and second outer yoke portions 402 extending rectilinearly in the circumferential direction around the outside of the coil 8.

In the present embodiment, a cup-shaped movable member 5 shown in FIGS. 3(A), (B), and (C) is disposed in the stator thus configured. This movable member 5 is a molded resin article having a perfectly octagonal bottom part 51 and thin, long magnet holders 52 rising from corner portions of the bottom part 51 in the axial direction.

Grooves 520 for inserting and fixing in place two sides of flat plate magnets 6 are formed in side surfaces of the magnet holders 52, and the two ends of the plate-shaped magnets 6 are inserted therein. A total of eight magnet holders 52 are formed in the movable member 5, and eight plate-shaped magnets 6 are held at regular angular intervals in the circumferential direction.

The magnets 6 herein are Nd-Fe-B based rare-earth magnets or resin magnets, and the front and back of the magnets are magnetized with opposite polarities as shown in FIG. 3(D).

The magnet holders 52 have a substantially triangular flat shape as seen from the axial direction, and the portions corresponding to apexes of the triangles extend in cuneiform fashion between adjacent inner yokes 3, as shown in FIG. 3(E). At the same time, the portions of the magnet holders 52 that correspond to the bottoms of the triangles extend between adjacent outer yokes 4.

Eight magnets 6 are positioned in the gaps 9A and 9B between the inner yokes 3 and outer yokes 4 in a state in which the movable member 5 thus configured is mounted on the frame 11 as shown in FIGS. 1(A) and (B). Also, the bottom part 51 of the movable member 5 serves as a fixing part for a base of a rod-shaped or cylindrical piston 50, and the piston 50 is mounted on an inner side of the cylindrical section 22 of the cylinder body 2.

In the linear actuator 1 configured in this manner, inner side surfaces of the magnets 6 are magnetized as S poles and outer side surfaces are magnetized as N poles, in which case a magnetic field shown by dotted arrows B1 and B2 in FIG. 1(B) is generated. When an alternating current is passed through the coil 8 in this state, a magnetic field shown by a solid arrow B3 is generated during the time the current passes from the front of the diagram to the reverse side, and the magnetic field from the magnets 6 and lines of magnetic force from the coil 8 have the same orientation on the side of the gap 9A, whereas the magnetic field from the magnets 6 and the lines of magnetic force from the coil 8 have opposite orientations on the side of the gap 9B. As a result, a downward force acts on the magnets 6.

By contrast, an upward force acts on the magnets 6 during the time the current passes from the reverse side of the diagram to the front.

Since forces of alternating orientation act on the magnets 6 in the axial direction in this manner, the movable member 5 formed integrally therewith oscillates in the axial direction, and reciprocating rectilinear movement is outputted from the piston 50 affixed to the movable member 5.

In this arrangement, the outer yokes 4 and inner yokes 3 have flat opposing surfaces, and eight yokes of each type are disposed at regular angular intervals in the circumferential direction. It is therefore possible to generate a drive force with substantially the same magnetic efficiency as when the outer yokes 4 and inner yokes 3 have arcuate opposing surfaces, and inner yokes 3 and outer yokes 4 with such a shape can be easily produced on a mass scale. Also, flat plate magnets 6 can be used if the outer yokes 4 and inner yokes 3 have flat opposing surfaces, and such magnets 6 can be easily mass-produced as well. Consequently, according to the present invention, it is possible to provide an inexpensive linear actuator 1 that can be produced on a mass scale.

Also, the movable member 5 has long, thin magnet holders 52 rising in the axial direction from the corner portions of the bottom part 51, and these magnet holders 52 have substantially triangular flat shapes as seen from the axial direction, and extend between adjacent inner yokes 3 and between adjacent outer yokes 4. Therefore, it is possible to prevent the orientation, shape, and other attributes of the magnets 6 from being altered by the magnetic force of adjacent magnets 6 even if strong, flat plate magnets 6 are used, which has the advantage of making assembly easier.

(Modification 1)

In the above embodiment, a block structure with a plurality of layered magnetic thin plates was used for the outer yokes 4 and inner yokes 3, but the outer yokes 4 and inner yokes 3 may also be formed from sintered soft magnetic components produced by molding and sintering materials obtained by applying resins to surfaces of pure iron powder or a powder prepared by adding trace amounts of additives to iron. Such sintered soft magnetic components have advantages in that they are commercially available under the product name FM-CM and the like from Sumitomo Electric Industries, Ltd., that various three-dimensional shapes can be readily formed with high machining precision, and that these components are isotropic, unlike magnetic thin plates. Coating the surface of the powder with a resin is also advantageous in increasing the internal resistance and markedly reducing the eddy-current loss, producing excellent high-frequency characteristics. Furthermore, sintered soft magnetic components can be easily crushed, and are therefore easy to recycle.

(Modification 2)

A coil 8 wound in a circular fashion was used in the above embodiment, but it is preferable for the coil 8 to be wound in a substantially polygonal shape and to be rectilinear between the first outer yoke portions 401 and second outer yoke portions 402, such as in the case of six, eight, and twelve outer yokes 4 as shown in FIGS. 4(B), 5(B), and 6(B), respectively.

With this configuration, no gap 88 is formed between the coil 8 and the first outer yoke portions 401, unlike when the coil 8 is wound in a circular fashion as shown in FIGS. 4(A), 5(A), and 6(A). Therefore, the number of turns of the coil 8 can be increased within a smaller space, and the performance of the linear actuator 1 can be improved. Conversely, when the number of turns of the coil 8 is the same, a width of the outer yokes 4 in the radial direction can be reduced, and a smaller size can be ensured.

For example, when the outside diameter of the outer yokes 4 is to be reduced to 99 mm and there are six outer yokes 4, the winding width of the coil 8 is 6.138 mm if the coil 8 is wound in a circular fashion as shown in FIG. 4(A), while the winding width of the coil 8 is 7.87 mm if the coil 8 is wound in a polygonal fashion as shown in FIG. 4(B).

When there are eight outer yokes 4, the winding width of the coil 8 is 7.35 mm if the coil 8 is wound in a circular fashion as shown in FIG. 5(A), while the winding width of the coil 8 is 8.4 mm if the coil 8 is wound in a polygonal fashion as shown in FIG. 5(B).

When there are twelve outer yokes 4, the winding width of the coil 8 is 7.868 mm if the coil 8 is wound in a circular fashion as shown in FIG. 6(A), while the winding width of the coil 8 is 8.4 mm if the coil 8 is wound in a polygonal fashion as shown in FIG. 6(B).

The driving force (performance) herein is directly proportional to the value determined by the following equation.

Yoke width×Number of yokes×Coil space

Therefore, the value determined by the above equation is as follows when the number of yokes is six, eight, and twelve.

When there are six yokes and the coil are circular:

21.5×6×6.138=791.8

When there are six yokes and the coil are polygonal:

21.5×6×7.87=1015.2

Where there are eight yokes and the coil are circular:

16×8×7.35=940.8

Where there are eight yokes and the coil are polygonal:

16×8×8.4=1075.2

Where there are twelve yokes and the coil are circular:

10×12×7.868=944.2

Where there are twelve yokes and the coil are polygonal:

10×12×8.4=1008

(Other Embodiments)

In the embodiment described above, the outer yokes 4 and inner yokes 3 were both held by the holding member made of the resin, but they may also be formed integrally with the holding member using insert molding or the like.

Also, from the standpoint of magnetic efficiency, it was assumed in the above embodiment that there were eight of the inner yokes 3 and the outer yokes 4 each, but the number of yokes may, for example, be twelve or any other number equal or greater than six.

Figure 4:
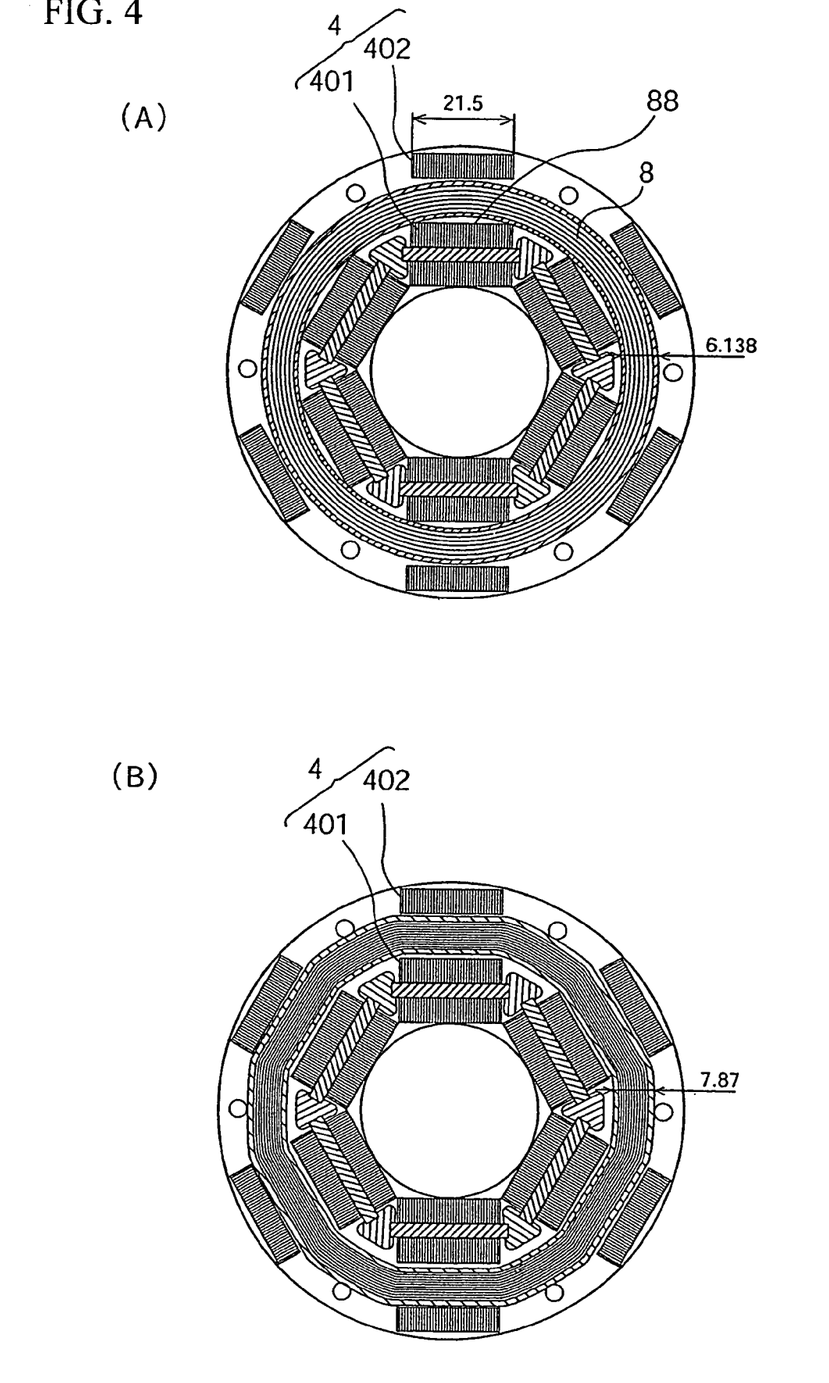
Figure 5:
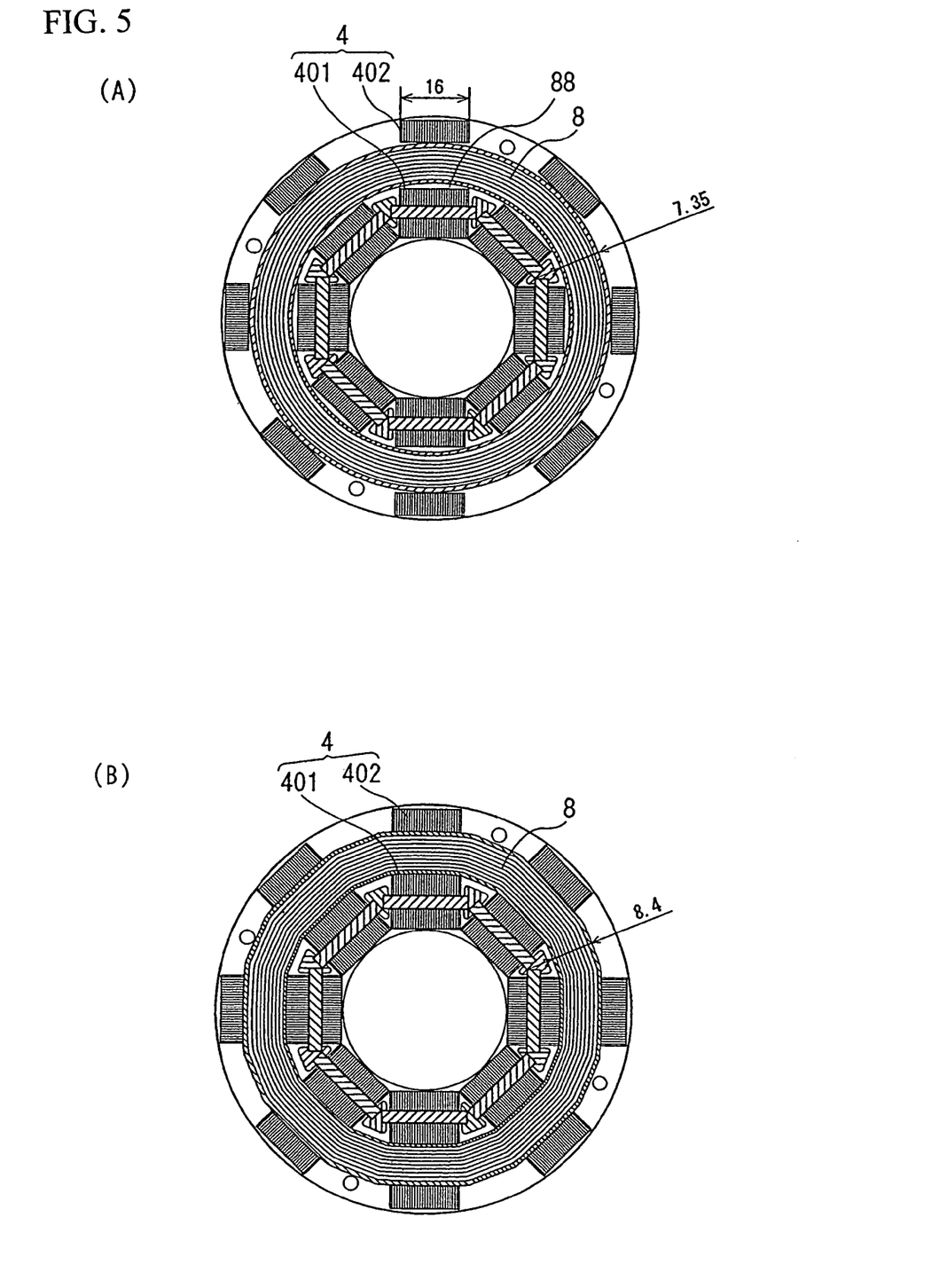

However, the number of inner yokes 3 and outer yokes 4 is preferably six to eight for the following reasons (see FIGS. 4 and 5).

When there are six to eight outer yokes 4, the number of magnet holders 52 is also six to eight. In this arrangement, the number of magnet holders 52 increases and the space occupied by the magnet holders 52 also increases as a result of the number of magnets 6 increasing with the increase in the number of outer yokes 4 and inner yokes 3. However, reducing the magnet holders 52 makes the magnet holders 52 incapable of withstanding the magnetic force exerted by the adjacent magnets 6 on each other because strong magnets 6 are used. Therefore, when the space occupied by the magnet holders 52 and the strength thereof are taken into account, it is better to have a smaller number of outer yokes 4 and inner yokes 3.

Figure 6:
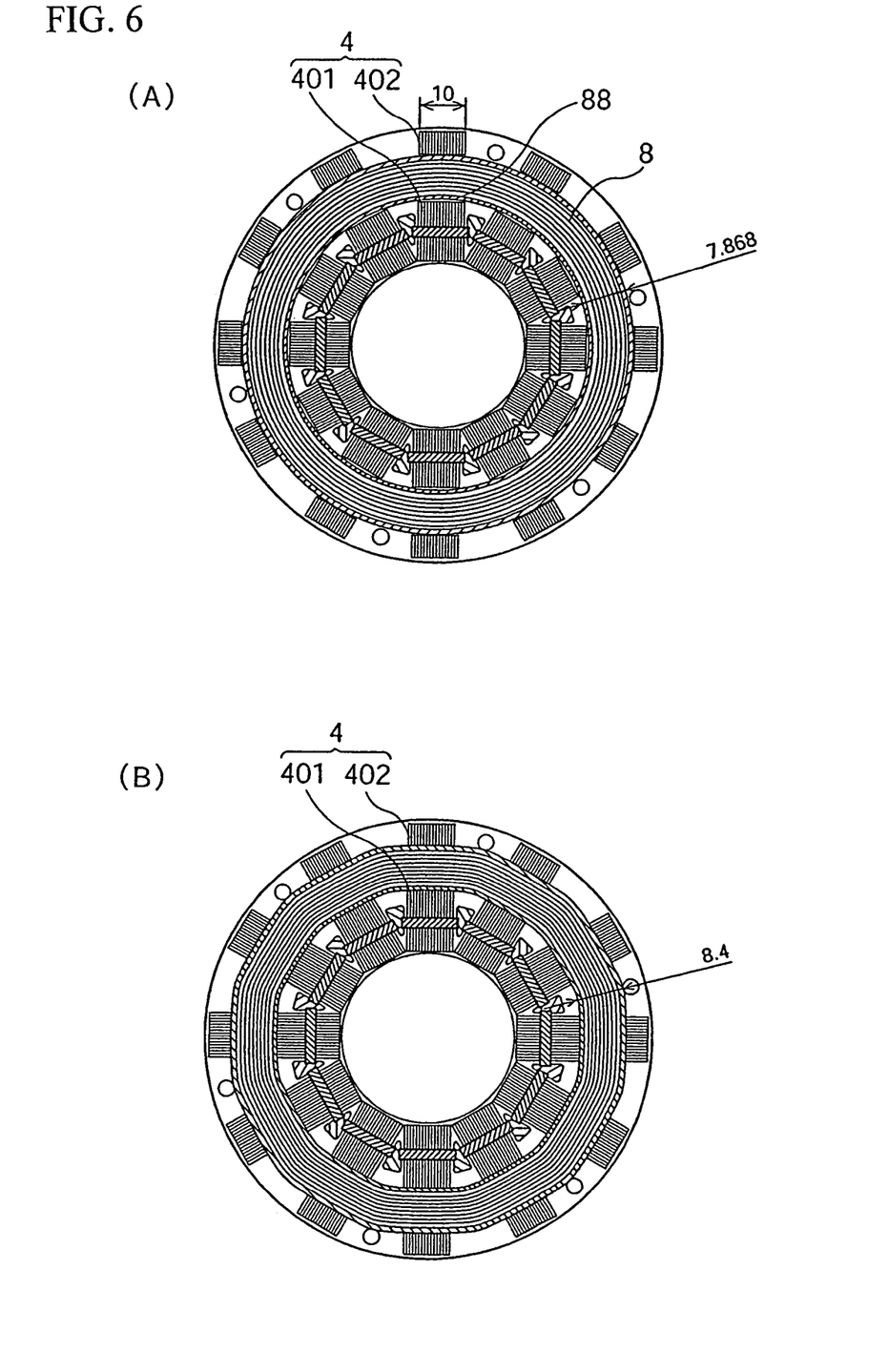

At the same time, the circumferential dimensions of the outer yokes 4 are determined by the number of the outer yokes 4. As a result, the entire length along which the outer yokes are disposed in the circumferential direction is also determined by the number of the outer yokes 4. For example, when there are six outer yokes 4 as shown in FIG. 4, the dimension in the circumferential direction is 21.5 mm, and the entire length along which the outer yokes 4 are disposed along the entire circumferential direction is 129 mm. Also, when there are eight outer yokes 4 as shown in FIG. 5, the dimension in the circumferential direction is 16 mm, and the entire length along which the outer yokes 4 are disposed along the entire circumferential direction is 128 mm. Furthermore, when there are twelve outer yokes 4 as shown in FIG. 6, the dimension in the circumferential direction is 10 mm, and the entire length along which the outer yokes 4 are disposed along the entire circumferential direction is 120 mm.

Also, in terms of the size of the space for accommodating the coil, it is better to have a large number of outer yokes 4, as was previously described with reference to FIGS. 4, 5, and 6.

Consequently, using six through eight outer yokes 4 is preferred for establishing balance among the elements when these plurality of elements are taken into account.

Furthermore, eight flat plate magnets 6 were used in the embodiment above, but octagonal prism-shaped magnets 6 may also be used.

INDUSTRIAL APPLICABILITY

As described above, in the linear actuator of the present invention, the outer yokes and inner yokes have flat opposing surfaces and face each other via gaps perpendicular to the axial direction, and pluralities of both are disposed at regular angular intervals in the circumferential direction. In practice, therefore, drive forces can be generated with substantially the same magnetic efficiency as when the opposing surfaces of the outer yokes and inner yokes are formed into arcuate shapes. Also the movable member has magnet holders for holding both sides of the magnets in a state in which at least part thereof extends between adjacent inner yokes and between adjacent outer yokes, making it possible to accurately set the orientation or location of the magnets by the magnet holders even if the magnets attract or repel each other. For this reason, assembly is easier to accomplish. Therefore, according to the present invention, it is possible to provide an inexpensive mass-produced linear actuator.

What is claimed is:

1. A linear actuator that includes inner yokes, outer yokes whereby gaps perpendicular to an axial direction are formed with the inner yokes, a coil wound on the outer yokes, and a movable member having magnets in the gaps and capable of moving in the axial direction; characterized in that pluralities of the outer yokes and inner yokes have planar opposing surfaces and are disposed at regular angular intervals in a circumferential direction; and the movable member comprises the magnets, each placed in each of the gaps formed by the outer yokes and inner yokes, and magnet holders disposed between adjacent magnets for holding both sides of the magnets in a state in which at least part thereof extends between adjacent inner yokes and between adjacent outer yokes.

2. The linear actuator according to claim 1, characterized in that the magnets of the movable member are flat plate magnets.

3. The linear actuator according to claim 1, characterized in that the magnet holder has a substantially triangular shape as seen from the axial direction, and at least part thereof extends between the adjacent inner yokes and between the adjacent outer yokes.

4. The linear actuator according to claim 1, characterized in that the inner yokes and outer yokes form the gaps at two locations separated in the axial direction.

5. The linear actuator according to claim 1, characterized in that six or more outer yokes and inner yokes are disposed at regular angular intervals in the circumferential direction.

6. The linear actuator according to claim 5, characterized in that the coil is configured as a common coil wound so as to encircle all six or more of the outer yokes disposed in the circumferential direction.

7. The linear actuator according to claim 6, characterized in that the outer yoke has a first outer yoke portion extending rectilinearly in the circumferential direction on an inner circumferential side of the coil, and a second outer yoke portion extending rectilinearly in the circumferential direction on an outer circumferential side of the coil;

wherein the coil is wound rectilinearly between the first outer yoke portion and the second outer yoke portion.

8. The linear actuator according to claim 7, characterized in that six through eight of the outer yokes are disposed at regular angular intervals.

9. The linear actuator according to claim 6, characterized in that the outer yokes are configured as a plurality of dividable yoke pieces; and the outer yokes have a structure wherein the coil separately wound is held on either side by the plurality of yoke pieces.

10. The linear actuator according to claim 1, characterized in that at least one of the outer yoke and inner yoke has a layered structure with a plurality of magnetic thin plates.

11. The linear actuator according to claim 1, characterized in that at least one of the outer yoke and inner yoke is configured from a sintered soft magnetic component.

12. A pump device characterized by the use of the linear actuator defined in claim 1.

13. A compressor device characterized by the use of the linear actuator defined in claim 1.

* * * * *